J. H. EVANS.
ANTISKID DEVICE.
APPLICATION FILED OCT. 31, 1917.
1,424,347.
Patented Aug. 1, 1922.
2 SHEETS—SHEET 1.
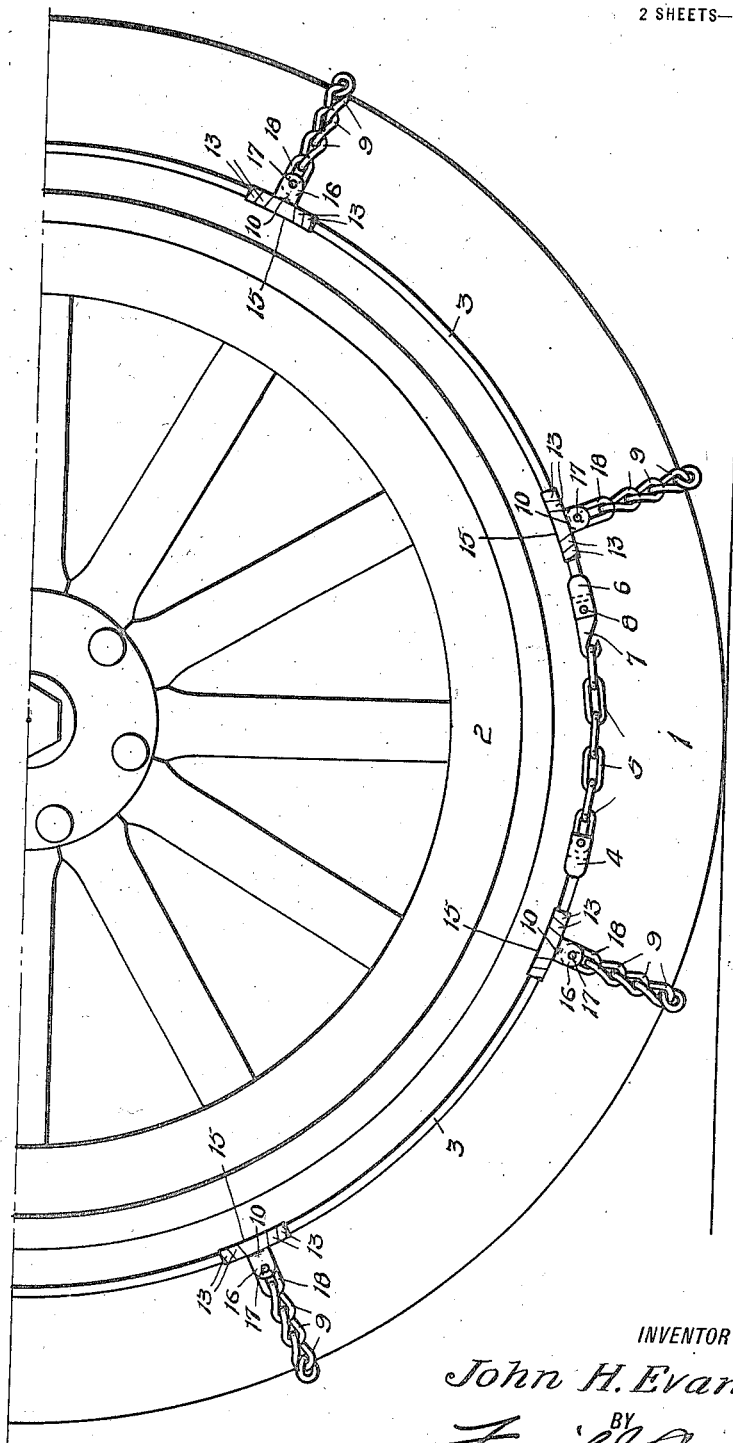
INVENTOR:
John H. Evans,
BY
Fred J. Parson
ATTORNEY.

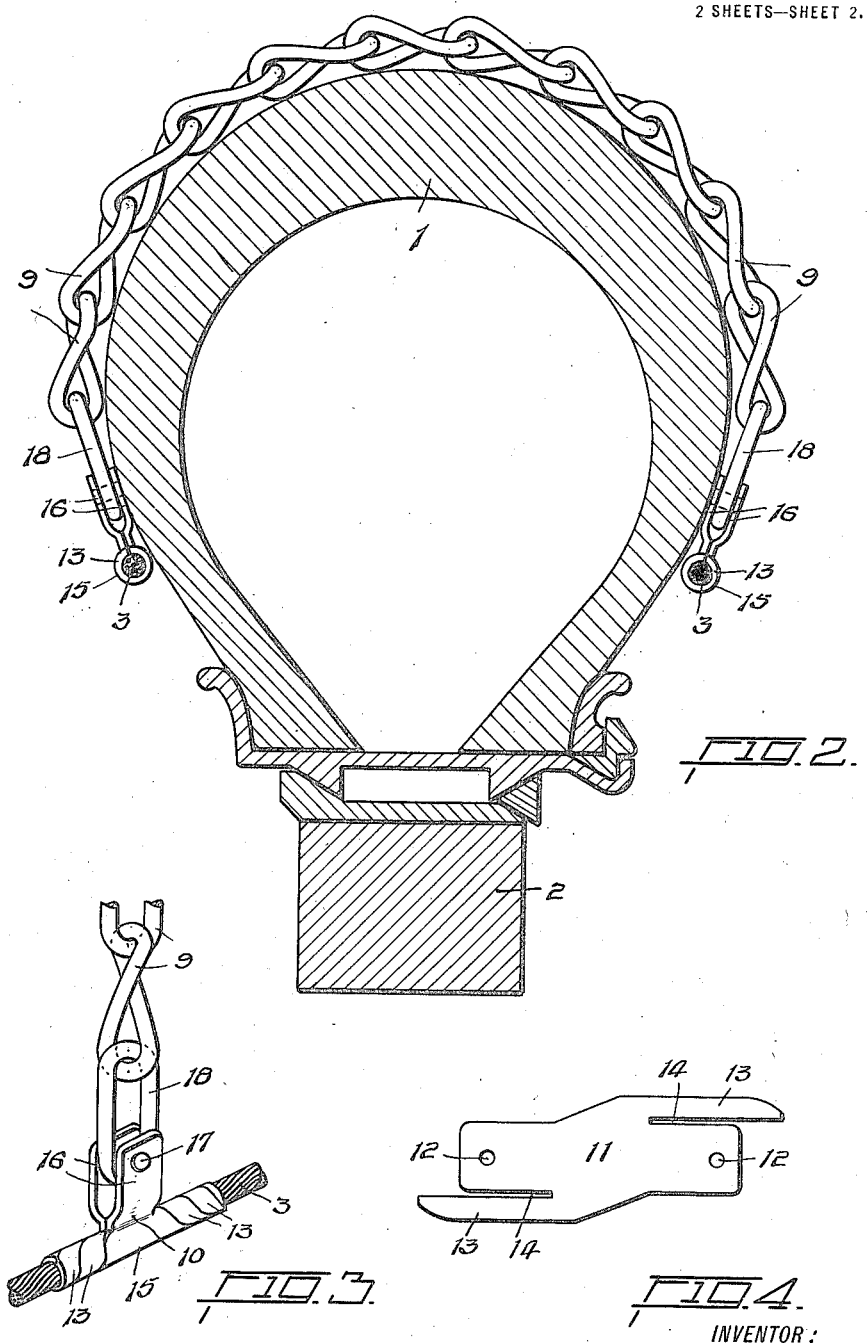

UNITED STATES PATENT OFFICE.

JOHN H. EVANS, OF NORTH CARROLLTON, MISSISSIPPI.

ANTISKID DEVICE.

1,424,347.

Specification of Letters Patent.  Patented Aug. 1, 1922.

Application filed October 31, 1917. Serial No. 199,555.

*To all whom it may concern:*

Be it known that I, JOHN H. EVANS, a citizen of the United States, residing at North Carrollton, in the county of Carroll and State of Mississippi, have invented certain new and useful Improvements in Antiskid Devices, of which the following is a specification.

My invention relates to anti-skid devices, and consists in the combination, constructions and arrangements of parts hereinafter described and claimed.

The object of my invention is to provide an anti-skid device which may be conveniently and quickly applied to an automobile tire or removed therefrom.

A further object of the invention is to provide the device with flexible side cables and novel means for connecting the transverse tread elements with the side cables.

A still further object of the invention is to provide novel means for adjustably connecting the ends of the side cables when the device is applied to a tire.

Other objects and advantages will appear in the following specification, and the novel features of the invention will be particularly pointed out in the appended claims.

My invention is illustrated in the accompanying drawings forming a part of this specification wherein like characters of reference denote similar parts throughout the several views.

Referring to the drawings:

Figure 1 is a side elevation of one half of a wheel and tire with my invention applied thereto.

Figure 2 is a transverse sectional view of a wheel felly and tire with my invention applied to the tire.

Figure 3 is a detail in perspective illustrating the connector between one of the side cables and a transverse tread chain.

Figure 4 is a plan view of the blank from which the connector is formed.

Referring to the accompanying drawings the reference character 1 designates a pneumatic automobile tire and 2 the wheel felly.

In carrying out the aim of my invention, I employ a pair of longitudinal side members 3 preferably in the form of flexible wire cables or their equivalents. One end of each cable 3 is provided with a fixed suitable fastener 4 to which is connected a plurality of suitable chain links 5. The opposite end of each cable 3 is provided with a fixed fastener 6 to which is pivotally connected a catch or hooked element 7 by means of the pin 8. The hooked elements 7 are adapted to be connected to any one of the chain links 4 when applied to a tire. As there are a number of chain links 4 employed, it will be observed that proper adjustment of the anti-skid device may be made to snugly fit the same upon a tire 1.

A plurality of suitable transverse tread elements 9, preferably in the form of connected chain links, are arranged at suitable spaced intervals between the side cable members 3, as is usual in anti-skid devices.

A plurality of suitable connectors 10 are employed and arranged in the manner shown for securing the ends of the transverse tread elements to the side cables 3.

The connectors 10 are each in the form of a flat metallic plate 11, as clearly shown in Figure 4. The plates are of an elongated, substantially rectangular formation and provided adjacent their ends with openings 12. Integrally formed with the plate 11 centrally of its side edges, are a pair of similarly formed tongues 13. These tongues 13 extend parallel with, but in slightly spaced relation to the adjacent side edges of the plate 11 and in the direction of, and beyond the opposite ends of the plate 11. The tongues 13 are formed by slitting the plate as at 14.

In applying the connectors 10 to the side cables 3, each plate 11 is bent upon itself intermediate of its ends to provide at its base portion a substantially tubular sleeve 15, as clearly shown in Figure 3, through which sleeve 15 the cable is adapted to pass. The ends of the plate 11 are disposed in spaced relation to provide opposed ears 16. The openings 12 are now in registration and a pin 17 is employed to pass through the openings for connection to the end flat links 18 of the transverse tread elements 9. After the plates 11 are thus disposed upon their cable 3, the tongues 13 are oppositely coiled helically and snugly about their cable, as clearly shown in Figure 3. The axis of the coils is coincident with that of the sleeve 15, so that the coiled tongues constitute in effect a continuation of the sleeve 15, and co-operate therewith in producing an elongated tube, having an inner bearing surface sufficiently great to securely maintain the connectors frictionally and fixedly in position upon the cables 3.

There is in this manner provided a simple, neat, and inexpensive, yet positive and practical connection between the side cables 3 and the tread elements 9 that will cause the tread elements to work effectively and to fit snugly to the tire. As the side cables are made from steel there will be no stretch of the side cables from wear.

This anti-skid device can be readily and easily repaired, as cable base will have practically no wear and new tread chains or other tread elements can be replaced by merely removing the pins 17.

The many advantages of the herein described anti-skid device will readily suggest themselves to those skilled in the art to which it appertains.

I am aware that slight changes in the exact arrangement, proportion and details of construction may be resorted to without departing from the true spirit of my invention, hence reserve the right to make any such changes as may fairly fall within the scope of the appended claims.

What I claim is:

1. A blank for forming a connector between a chain link or the like and a cable, consisting of a plate having apertures adjacent its ends, and fingers integral with opposite edge portions of the plate and extending toward opposite ends of the latter.

2. A blank for forming a connector between a tread chain link and a cable, consisting of a plate having apertures adjacent its ends, and fingers integral with opposite side edge portions of said plate midway the ends thereof and extending in spaced parallel relation to the side edges of the plate toward and past opposite ends of the plate.

In testimony whereof, I have hereunto signed my name to the specification.

JOHN H. EVANS.